US006301563B1

(12) United States Patent
Brown et al.

(10) Patent No.: US 6,301,563 B1
(45) Date of Patent: *Oct. 9, 2001

(54) SYSTEM AND METHOD FOR DETERMINING RISK EXPOSURE BASED ON ADJACENCY ANALYSIS

(75) Inventors: Randall E. Brown, Neshanic Station; Kathleen P. Marvel, Martinsville; Scott R. Spencer, Lebanon, all of NJ (US)

(73) Assignee: The Chubb Corporation, Warren, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,132

(22) Filed: Apr. 14, 1998

(51) Int. Cl.$^7$ .............................. G06F 17/60; G06F 19/00
(52) U.S. Cl. ...................... 705/4; 705/1; 701/1; 701/50
(58) Field of Search .............................. 705/4, 3; 701/50, 701/1; 364/474.2

(56) References Cited

U.S. PATENT DOCUMENTS

| | | | |
|---|---|---|---|
| 5,032,989 | * 7/1991 | Tornetta | 364/401 |
| 5,490,081 | * 2/1996 | Kuromoto | 364/474.2 |
| 5,680,305 | * 10/1997 | Apagar, IV | 364/401 |
| 5,735,065 | * 4/1998 | Yamagata et al. | 701/50 |
| 5,735,352 | * 4/1998 | Henderson et al. | 701/50 |
| 5,751,576 | * 5/1998 | Monson | 364/188 |
| 5,805,446 | * 9/1998 | Hatakeyama et al. | 364/148 |
| 5,838,562 | * 11/1998 | Gudat et al. | 701/50 |
| 5,852,810 | * 12/1998 | Sotiroff et al. | 705/27 |
| 5,905,968 | * 5/1999 | Staub et al. | 702/150 |

FOREIGN PATENT DOCUMENTS

0604404B1 * 12/1990 (EP) .

OTHER PUBLICATIONS

"New Electronic Service Alerts California Realtors and Prospective Homebuyers to Potentially Hazardous Environmental Sites Near Homes" Aug. 2, 1994; PRNewswire; Dialog file 813, Accession No. 0729541.*

William Environmental Data Needed for Public Health Assessments; Mar. 3, 1993; Department of Health and Human Services vol.: 58; Dialog file 180, Accession No. 02275016.*

(List continued on next page.)

Primary Examiner—Sau Rimell
Assistant Examiner—Romain Jeanty
(74) Attorney, Agent, or Firm—Gibbons, Del Deo, Dolan, Griffinger & Vecchione

(57) ABSTRACT

A system and method that determines risk exposure for a selected site by using adjacency analysis to identify and process sites that may not be visible to the user on a display unit. The system determines the risk exposure for a selected site by using geographical adjacency to evaluate other sites for potential impact. The system geographically stores hazard sites and sensitive receptor sites. Moreover, the system creates and stores a sphere of influence and a sphere of receptivity for each hazard site and sensitive receptor site, respectively. For the selected site, the system calculates a sphere of evaluation based on a geographical location of the selected site and a given radial extent. The system determines if the sphere of influence or the sphere of receptivity intersects the sphere of evaluation and outputs the results of the intersection analysis to the display unit. The system analyzes sites that are external to the view area by examining spatial relationships between the selected site and said hazard sites. As such, all potential impact sites are not required to be visible to the user. The viewable area of the display unit is automatically reconfigured to include the farthest evaluated site.

34 Claims, 3 Drawing Sheets

OTHER PUBLICATIONS

Bhargava: "Final Record of Decision"; Jul. 11, 1997; General Services Administration; Dialog file 180, Accession No. 02421274.*

Steve; "Maternal Residential exposure to hazardous waste site and risk fo rselected congenital malfunctions"; Dec. 1995; Corporate Source/Institution vol. 57/03. Dialog file 35, Accession No. 01491306.*

Peter et al. "Possible contributions of Hydroinformatics to risk analysis in insurance"; Dec. 1996; Hydroinformatics Muller.*

Surya et al. "A knowledge–Based System For International Hurricane Risk Management"; Jun. 1995; Risk Management Solutions Inc.*

Kohli et al. Individuals living in areas with high background radon: a GIS method to identify population at risk; Jun. 1997; Deparment of Medical Informatics; Dialog file 151, accession No. 02879992.*

Steven "EPA readies Superfund insurance"; Dec. 1987; Engineering News–Record; Dialog file 624, Accession No. 0052127.*

Barry et ali A GIS–based approach for evaluating regional groundwater pollution potential with DRASTIC; Mar. 1990; Journal of Soil and Water Conservation; Dialog file 40, Accession No. 00383116.

* cited by examiner

SYSTEM AND METHOD FOR DETERMINING RISK EXPOSURE BASED ON ADJACENCY ANALYSIS

FIELD OF THE INVENTION

This invention relates to a system and method for determining risk exposure for a selected site, and in particular, using adjacency analysis to identify and process other sites that impact the selected site.

BACKGROUND OF THE INVENTION

The ability to effectively and efficiently use geographical information systems, such as map applications, in combination with informational databases to determine risk exposures and insurance cost estimates, have been hampered by the inability to manage the megabytes of information that are associated with user specified map areas. In typical geographic applications, the information available to the user corresponds to the area being displayed on an end user's terminal. That is, if an underwriter wants to evaluate the risk exposure for a selected site, the terminal must display the entire area that is to be included in the risk evaluation. Therefore, if relatively large areas have to be evaluated, the user must designate the display frame so that it encompasses the entire area. The geographic or mapping application then obtains all of the data corresponding to the framed area and paints the frame. The data corresponding to the selected area is typically sent over a network to the terminal. This data includes among other items, hazardous waste sites, dangerous business operations, schools, hospitals, power sources and gas stations.

A drawback of this approach is that the amount of data being passed through the network for relatively large areas is enormous and will detrimentally affect the network processing speed. For example, some mapping applications use latitude and longitude for reference and designation purposes. In these applications, the system has to handle over 300,000 points to identify only 180 hazard sites. Minimization of data traffic is therefore critical to the efficient use of network resources. Moreover, each time the underwriter changes the risk evaluation criteria, a new set of display information must be sent over the network. The inefficiency of this approach and the resulting traffic congestion on the network is further accentuated in a multiple user environment.

A further disadvantage of displaying the entire evaluation area is that the user may get overwhelmed with the corresponding amount of information. The larger the map frame, the denser the data that the user has to assimilate. As a result, the user loses focus of the immediate area of concern, which is normally smaller than the evaluation area. For example, if a manufacturing plant was worried about the impact of an explosion and fire at the plant, the impact area might be a one mile radius, whereas the risk evaluation area might include a five mile radius. Accordingly, there is a need to provide a system and method that initially limits the display area to the immediate area of concern, performs risk evaluation of sites not immediately visible to the user and thereby minimizes traffic congestion on the network.

SUMMARY OF THE INVENTION

The present invention is a system and method that determines risk exposure for a selected site by using adjacency analysis to identify and process sites that may not be visible to the user. Adjacency is defined as the ability to relate one geographic point with another using mapping applications and visualization tools. Adjacency permits the evaluation of geographic points that are external to the viewable area by analyzing spatial relationships between the selected point and all other points that meet a user designated criteria. As such, all potential impact points are not required to be visible to the user. Importantly, the present invention permits the visible area to be maintained at a user manageable level and additionally, allows evaluation of non-visible sites that may impact the selected site.

In an exemplary embodiment of the present method, a system determines risk exposure for a selected site by using geographical adjacency to evaluate other sites for potential impact. The system geographically stores hazard sites and sensitive receptor sites. Moreover, the system creates and stores a sphere of influence and a sphere of receptivity for each hazard site and sensitive receptor site, respectively. For the selected site, the system calculates a sphere of evaluation based on a geographical location of the selected site and a given radial extent. The system determines if the sphere of influence or the sphere of receptivity intersects the sphere of evaluation and outputs the results of the intersection analysis to a display unit.

Advantageously, the system and method of the present invention evaluate non-displayed sites by retrieving only those sites that result in intersections. This prevents burdening the network by retrieving potentially non-impact points. Moreover, the user does not have to use a trial and error approach to determine the proper display area since the adjacency analysis evaluates all sites that impact a user defined sphere of evaluation. As a result, the present invention alleviates network traffic by virtually eliminating user guesswork. The above factors make the present invention an efficient and accurate means for determining risk exposure for a selected site.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 1 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

The present invention is a system and method that determines risk exposure for a selected site by using adjacency analysis to identify and process sites that may not be visible to a user. The system and method allow the user, for example an underwriter, to select a viewable area that emphasizes the selected site without decreasing the accuracy and effectiveness of the risk exposure analysis. This is achieved by using adjacency analysis, where adjacency is defined as the ability to relate one geographic point with another using mapping applications and visualization tools. Adjacency permits the evaluation of geographic points that are external to the viewable area by analyzing spatial relationships between the selected point and all other points that meet a user designated criteria. As such, all potential impact points are not required to be visible to the user.

In general, a user will select an evaluation site and a desired evaluation radius to define a sphere of evaluation. The sphere of evaluation ("$S_E$") is then analyzed with respect to hazardous waste sites, dangerous business operations and their associated spheres of influence ("$S_I$") and sensitive receptors and their associated spheres of receptivity ("$S_R$"). As shown below, the evaluation may include sites that are not visible to the user but are analyzed due to their spatial relationship with the selected site and its sphere of evaluation. If an intersection is found between $S_E$ and $S_R$ or $S_E$ and $S_I$, the distance between the sites is calculated and stored. The system incorporates information from other databases to finalize the output data. The user receives the output data in a tabular format and furthermore, the user's viewable area display is automatically reconfigured to include the farthest evaluated site.

Figure 1:
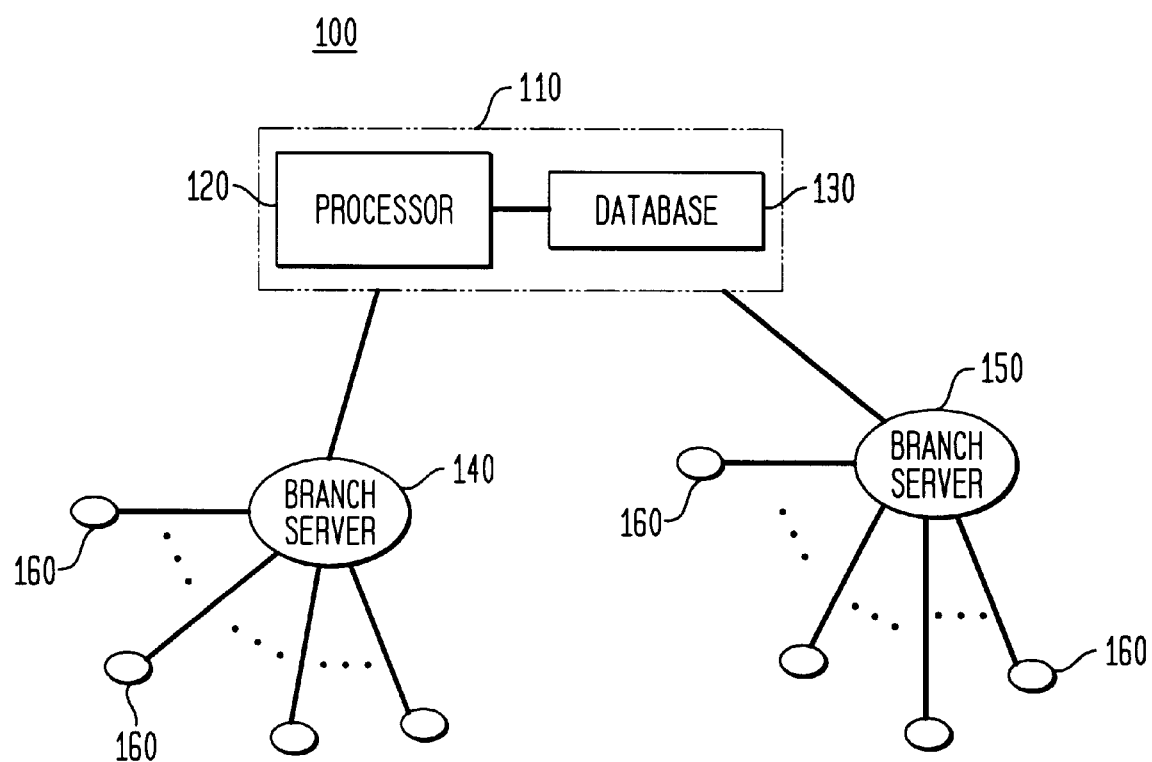
FIG. 1 is an exemplary embodiment of a system in accordance with the present invention.

FIG. 1 illustrates an exemplary embodiment of a system 100 which utilizes the present invention. System 100 consists of a computing device 110 that performs the majority of the functionality described herein. Computing device 110 includes a processor 120 that implements the present invention functionality and a database 130 that contains the site information against which an evaluation is performed. Computing device 110 is coupled to branch servers 140 and 150, which in turn are coupled to user terminals 160. System 100 is configured in an exemplary network configuration. Other multiple access network configurations can be implemented with respect to the present invention.

Figure 2:
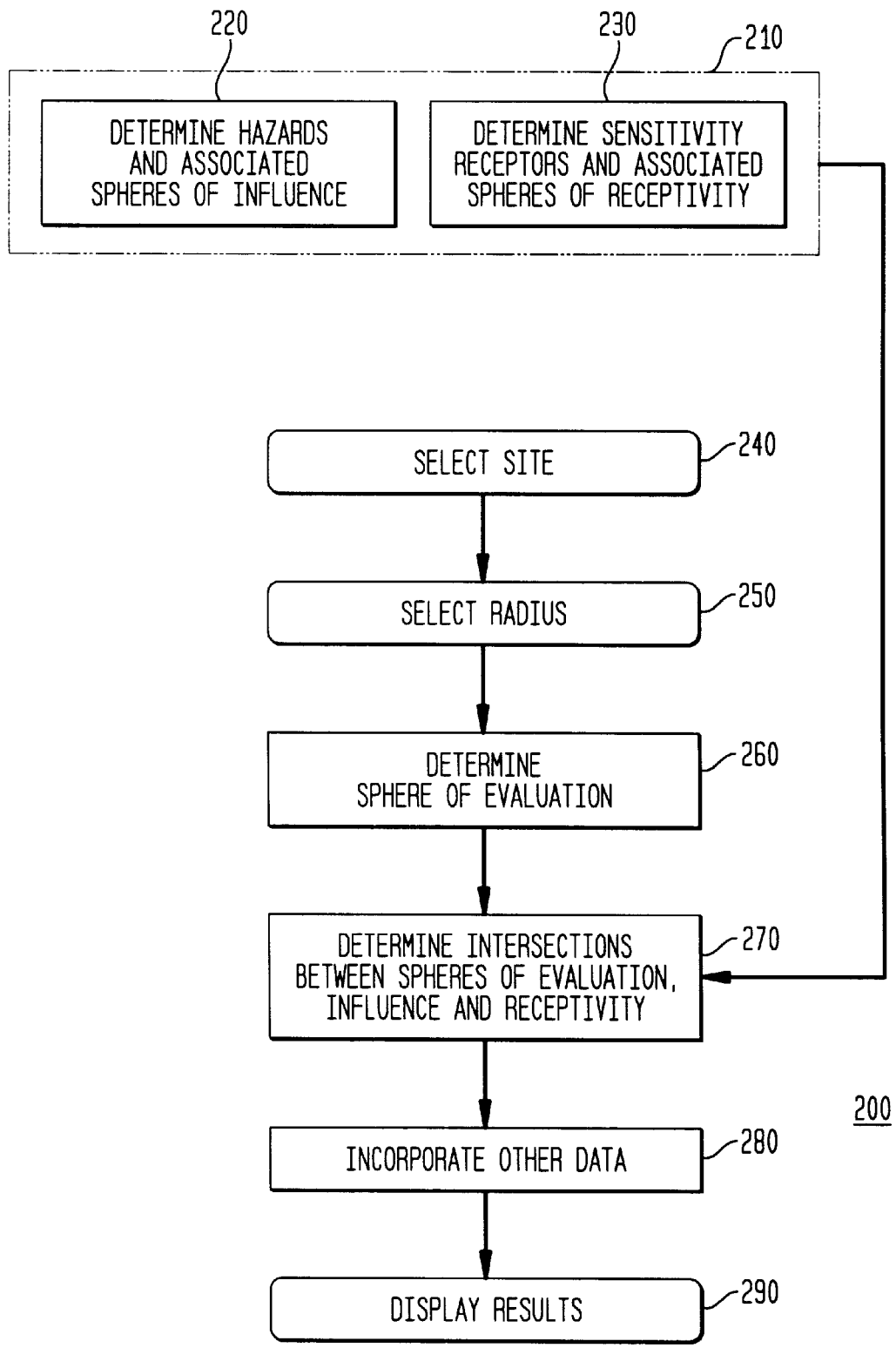
FIG. 2 is a functional flowchart of the adjacency analysis in accordance with the method of the present invention.

Referring now to FIG. 2, an exemplary functional flowchart 200 is presented of a risk exposure evaluation using the adjacency analysis method of the present invention. The method is employable in system 100 of FIG. 1 and is illustrated with reference to display 300 of FIG. 3. All points or sites are initially labeled using a coordinate system, e.g., a latitude and longitude value (step 210). For each hazard site, a sphere of influence is created which defines the space that can be impacted by potential mishap at the hazard site (step 220). For example, hazard H has a sphere of influence $S_{I,H}$. Note that the term hazard is meant to refer to, for example, to hazardous waste sites, dangerous business operations, power stations, leaky underground storage tanks, nuclear sites, etc. For each sensitive receptor, such as a school or a hospital, a sphere of receptivity is created that defines the region in which any impact will affect the sensitive receptor (step 230).

Standard mathematical techniques are used to create the spheres of influence and sensitivity. In an exemplary embodiment, the hazard and sensitive receptor site coordinates along with the associated spheres are stored in database 130 of FIG. 1. The coordinates are used to tie all of the databases that contain information corresponding to the sites. The databases could include, for example, business data, address, type of hazard, type of sensitivity receptor (schools, hospitals, playgrounds etc.), and insurance carrier information.

Figure 3:
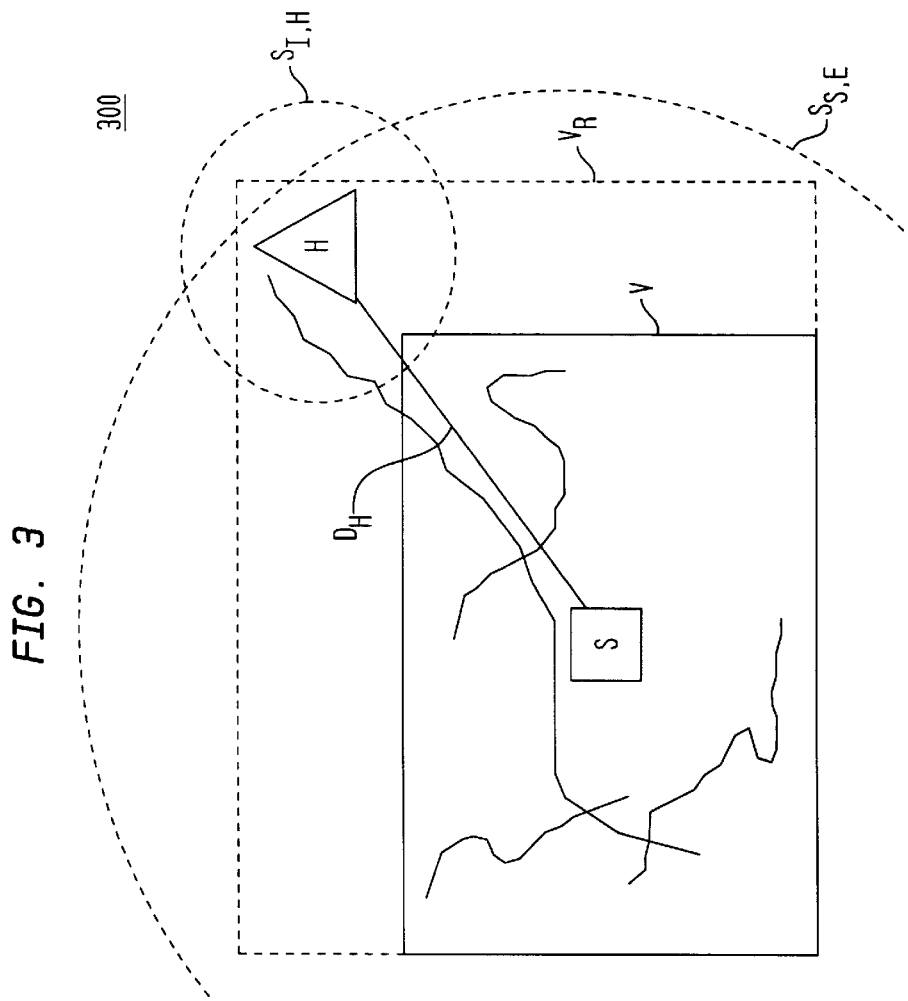
FIG. 3 illustrates visually the adjacency analysis process in accordance with the method of the present invention.

Referring to FIG. 2 and FIG. 3, a user, such as an underwriter, will call up a map of a selected area and select display extents that will result in a manageable view area V (step 240). The underwriter will then select a site S for which a risk exposure evaluation is desired (step 240). The selected site can be any point, including buildings, rivers and undeveloped land. A radial extent is then entered to define the region for which the risk evaluation will be performed (step 250). This radial extent may extend beyond the viewable area V. Given the radial extent, a sphere of evaluation, $S_{S,E}$, will be created on-the-fly for the selected site (step 260). As stated above, the method used to create the sphere is presented below.

Using standard mathematical techniques, the system of the present invention will determine if the sphere of evaluation intersects with any spheres of influence and with any spheres of receptivity (step 270). By using the principles of adjacency, the present invention is able to evaluate sites outside of the user's viewable area. That is, external sites are brought into the analysis by examining the spatial relationship between the associated site and sphere coordinates. For each determined intersection, the system will calculate the distance from the selected site and the intersected site. For example, in FIG. 3, the system will determine the distance $D_H$ from the hazard site H to the selected site S. The intersected site data is then incorporated with information from other databases to form the output that is sent to the underwriter (step 280). For example, insurance coverage data could be used to determine the total risk exposure of the carrier in the selected site's locale, which for example, could include adjacent hazards, other businesses and other insureds.

The underwriter is able to review the output in multiple formats (step 290). The system automatically reconfigures the view area, shown as $V_R$ in FIG. 3, to include the farthest intersecting site (step 290). The underwriter is also able to review all of the intersected sites in a tabular format. This permits the underwriter to check the type of hazard or sensitivity receptor and other pertinent business information.

A system and method for determining risk exposure based on adjacency analysis is described herein. The system initially creates and stores spheres of influence and receptivity for hazards and sensitive receptors. After a site is selected and a radial extent is input, the system calculates on-the-fly a sphere of evaluation. This sphere of evaluation is then correlated against the stored spheres of influence and receptivity to determine if any intersections exist. The system incorporates other database information for all intersecting sites and presents the output to the user in tabular and graphical formats.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A system for use in evaluating insurance risk for a site selected from a view area shown on a display unit, the system using geographical adjacency to evaluate other sites for potential risk impact, the system comprising:

means for determining and storing a geographical location for at least one hazard site in relation to a geographical location of said selected site in said view area, and for determining a sphere of influence for each said at least one hazard site;

means for determining a sphere of evaluation for said selected site in respect to a given radius about a geographical location of said selected site;

means for determining an intersection between said sphere of evaluation and spheres of influence for ones of said at least one hazard site; and means for outputting results of an intersection analysis to the display unit.

2. The system according to claim 1, wherein said means for outputting includes means for automatically reconfiguring the view area to include a farthest intersecting site.

3. The system according to claim 1, wherein said means for determining a sphere of evaluation calculates a distance from the selected site to any intersecting site.

4. The system according to claim 1, wherein said means for outputting further includes:

means for incorporating information related to each site constituting said intersection; and means for presenting said results and said information in a tabular format.

5. The system according to claim 4, wherein said means for presenting determines a total risk exposure for a selected insurance carrier.

6. The system according to claim 1, wherein said means for determining a sphere of evaluation includes means for analyzing hazard sites that are external to the view area by examining spatial relationships between the selected site and said hazard sites.

7. The system according to claim 1, wherein:

said means for determining and storing is further operable to determine and store a geographical location for at least one sensitive receptor site, each said at least one sensitive receptor site having a sphere of receptivity; and said means for determining an intersection determines if said sphere of receptivity intersects said sphere of evaluation.

8. The system according to claim 7, wherein said means for outputting includes means for automatically reconfiguring the view area to include a farthest hazard site and a farthest sensitive receptor site determined to intersect said sphere of evaluation.

9. The system according to claim 7, wherein said means for calculating calculates a distance from the selected site to any site determined to intersect said sphere of evaluation.

10. The system according to claim 7, wherein said means for determining a sphere of evaluation includes means for analyzing sensitive receptor sites that are external to the view area by examining spatial relationships between the selected site and said sensitive receptor sites.

11. The system according to claim 1, wherein said means for determining a sphere of evaluation, said means for determining an intersection, and said means for outputting are done on-the-fly.

12. A method for use in evaluating insurance risk for a site selected from a view area shown on a display unit, the method using geographical adjacency to evaluate other sites for potential risk impact, the method comprising the steps of:

determining and storing a geographical location for at least one hazard site in relation to a geographical location of said selected site in said view area, and determining a sphere of influence for each said at least one hazard site;

determining a sphere of evaluation for said selected site in respect to a given radius about a geographical location of said selected site;

determining an intersection between said sphere of evaluation and spheres of influence for one of said at least one hazard site; and outputting results of an intersection analysis to the display unit.

13. The method according to claim 12, wherein said step of outputting includes the step of automatically reconfiguring the view area to include a farthest intersecting site.

14. The method according to claim 12, wherein said step of determining a sphere of evaluation calculates a distance from the selected site to any intersecting site.

15. The method according to claim 12, wherein said step of outputting further includes the steps of:

incorporating information related to each intersecting site; and presenting said results and said information in a tabular format.

16. The method according to claim 12, wherein said step of calculating includes the step of analyzing hazard sites that are external to the view area by examining spatial relationships between the selected site and said hazard sites.

17. The method according to claim 12, further including the steps of:

determining and storing a geographical location for at least one sensitive receptor site, each said at least one sensitive receptor site having a sphere of receptivity;

determining if said sphere of receptivity intersects said sphere of evaluation.

18. The method according to claim 12, wherein said step of determining a sphere of evaluation includes the step of analyzing sensitive receptor sites that are external to the view area by examining spatial relationships between the selected site and said sensitive receptor sites.

19. The method according to claim 12, wherein said step of determining a sphere of evaluation, said step of determining, and said step of outputting are done on-the-fly.

20. An apparatus that uses geographical adjacency for use in evaluating sites for potential insurance risk on a site selected from a view area displayed on a monitor, comprising:

a memory for storing a geographical location for at least one hazard site having a sphere of influence;

a processor coupled to said memory, said processor operable to calculate a sphere of evaluation based on a geographical location of the selected site and a given radial extent;

said processor further operable to determine an intersection between said sphere of evaluation and spheres of influence for ones of said at least one hazard site; and said processor further operable to output results of an intersection analysis to the display unit.

21. The apparatus according to claim 20, wherein said processor automatically reconfigures the view area to include a farthest intersecting site.

22. The apparatus according to claim 20, wherein said processor calculates a distance from the selected site to any intersecting site.

23. The apparatus according to claim 20, wherein said processor incorporates information related to each intersecting site and presents said results and said information in a tabular format.

24. The apparatus according to claim 20, wherein said processor determines a total risk exposure for a selected insurance carrier.

25. The apparatus according to claim 20, wherein said processor analyzes hazard sites that are external to the view area by examining spatial relationships between the selected site and said hazard sites.

26. The apparatus according to claim 20, wherein:
said memory stores a geographical location for at least one sensitive receptor site, each said at least one sensitive receptor site having a sphere of receptivity; and
said processor determines if said sphere of receptivity intersects said sphere of evaluation.

27. The apparatus according to claim 20, wherein said processor automatically reconfigures the view area to include a farthest hazard site and a farthest sensitive receptor site determined to intersect said sphere of evaluation.

28. The apparatus according to claim 20, wherein said processor analyzes sensitive receptor sites that are external to the view area by examining spatial relationships between the selected site and said sensitive receptor sites.

29. The apparatus according to claim 20, wherein said processor functions of calculating a sphere of evaluation, determining an intersection and outputting results are done on-the-fly.

30. A method for insurance risk evaluation in respect to a selected geographic site, in consideration of other geographically proximate sites representing possible risk interactions for said selected site, said method comprising the steps of:
defining an evaluation region about said selected geographic site, said evaluation region being modeled as a sphere centered at said selected geographic site;
determining a location for one or more of said geographically proximate risk-interaction sites, wherein each said determined risk-interaction site has a known spatial relationship to said selected geographic site;
determining a region of risk-interaction impact about each said determined risk-interaction site, said impact region being modeled as a sphere centered at said risk-interaction site;
finding points of intersection between said evaluation sphere and ones of said impact-region spheres; and
identifying risk-interaction sites corresponding to said ones of said impact region spheres intersecting said evaluation sphere, determining a geographic relationship between each said intersecting risk-interaction site and said selected geographic site, and causing said identified sites and said geographic relationships to be provided to a user.

31. A system for use to determine risk exposure as part of an insurance cost estimation, said system comprising
a computer network and at least one user interface connected to said network;
a computing device operatively connected to said at least one user interface via said network;
said computing device in including a memory and a processor;
said memory including a map of a region;
said map including a plurality of geographic sites wherein a first set of said geographic sites are hazard sites and a second set of said geographic sites are sensitive receptor sites;
said memory including at least one database having information about said hazard sites and said receptor sites;
said processor under the control of software is adapted to:
calculate on said map, using said at least one database, a sphere of influence for each of said hazard sites and calculate a sphere of receptivity for each of said receptor sites;
respond to a user selection of an evaluation site by transmitting a first portion of said map having said evaluation site located therein to said user interface via said network;
respond to entry of a radial extent by calculating a sphere of evaluation using said radial extent and location of said evaluation site,
apply a geographical adjacency routine to determine if said sphere of evaluation overlaps with at least one sphere selected from the group consisting of spheres of influence and spheres of receptively to identify an intersection of said evaluation sphere with said at least one sphere;
respond to the identification of an intersection by transmitting a second portion of said map having said evaluation site and a site corresponding to said at least one sphere to said user interface via said network.

32. The system of claim 31 wherein said hazardous sites include at least one site selected from the group consisting of hazardous waste sites, dangerous business operations, power stations, leaky underground storage tanks and nuclear material sites.

33. The system of claim 31 wherein said sensitive receptor sites include at least one site selected from the group consisting of schools and hospitals.

34. The system of claim 31 wherein said first portion of said map is smaller than said sphere of evaluation to reduce network transmission time.

* * * * *